(12) United States Patent
Donck

(10) Patent No.: US 6,351,873 B1
(45) Date of Patent: Mar. 5, 2002

(54) DECORATIVE EQUIPMENT PIECE USED AS A HANDLE

(76) Inventor: Daniel Donck, Verbeekstraat, 225, B-3090 Overijse (BE)

(*) Notice: Subject to any disclaimer, the term of this patent is extended or adjusted under 35 U.S.C. 154(b) by 0 days.

(21) Appl. No.: 09/284,675
(22) PCT Filed: Oct. 30, 1997
(86) PCT No.: PCT/BE97/00126
  § 371 Date: Apr. 16, 1999
  § 102(e) Date: Apr. 16, 1999
(87) PCT Pub. No.: WO98/18602
  PCT Pub. Date: May 7, 1998

(30) Foreign Application Priority Data
Oct. 31, 1996 (BE) .............................................. 9600926

(51) Int. Cl.$^7$ ............................. A47J 45/00; E05B 1/00
(52) U.S. Cl. ...................................................... 16/422
(58) Field of Search ................... 16/422, 417, DIG. 24; 411/180, 372.5, 372.6, 377, 408, 409; 63/36, 33; 403/342, 343; 24/163 K; D8/305

(56) References Cited

U.S. PATENT DOCUMENTS

| | | | | |
|---|---|---|---|---|
| 369,649 | A | * | 9/1887 | Moegling .................. 63/36 X |
| 813,690 | A | * | 2/1906 | Corbin .................... 411/180 X |
| 1,298,308 | A | * | 3/1919 | Dodds .................. 411/372.6 X |
| 2,239,340 | A | * | 4/1941 | Passantino et al. ......... 362/307 |
| 3,237,917 | A | * | 3/1966 | Kunzer et al. .......... 411/377 X |
| 3,722,565 | A | * | 3/1973 | Miller, Jr. et al. ....... 411/180 X |
| 4,642,855 | A | * | 2/1987 | Densmore ..................... 24/310 |
| 4,968,202 | A | * | 11/1990 | Lanham .................. 411/377 X |
| 5,350,266 | A | * | 9/1994 | Espey et al. ............ 411/377 X |
| 5,630,259 | A | * | 5/1997 | Ricketts ....................... 24/482 |

* cited by examiner

Primary Examiner—Lynne H. Browne
Assistant Examiner—Yismal Patel
(74) Attorney, Agent, or Firm—Ladas & Parry

(57) ABSTRACT

A component for a domestic or furnishing fitting, which comprises a mollusc shell (1) which is generally strengthened, at least locally, by means of a curable material (3), and a mount (5) secured to the said shell (1). This mount (5) is provided with means for securing to a member. The component, preferably used as a handle, has very high resistance to stresses on account of its structure.

12 Claims, 2 Drawing Sheets

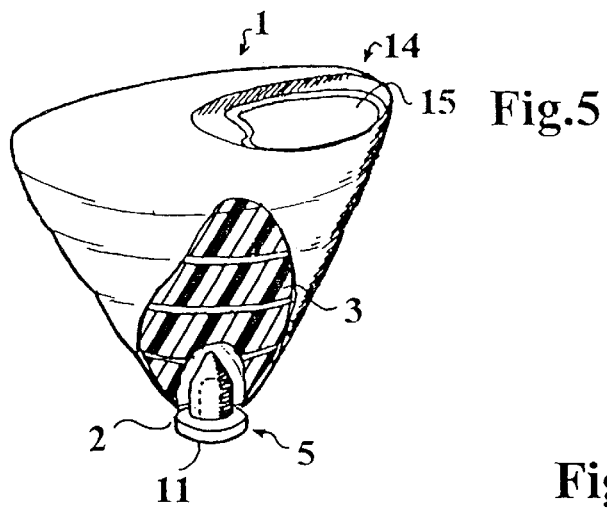
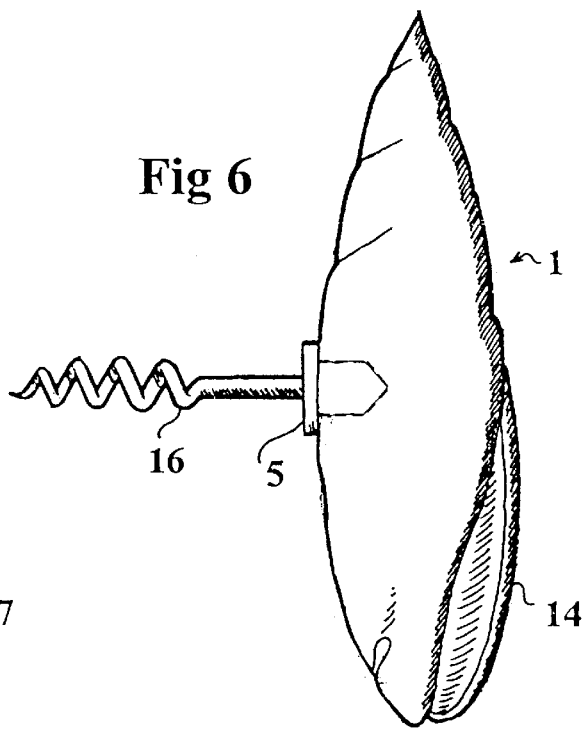
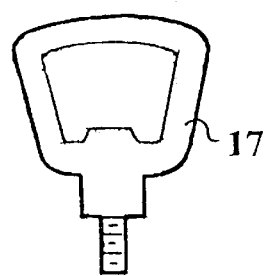
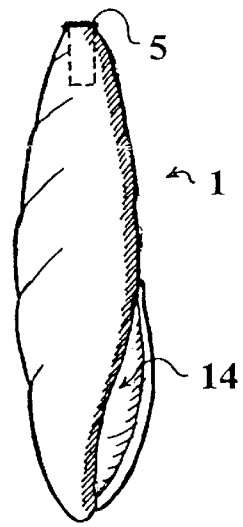
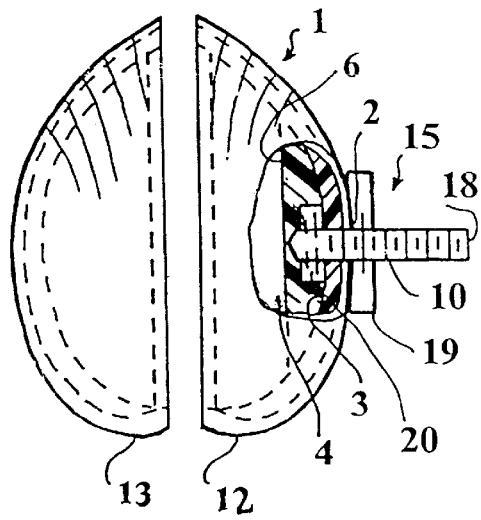

DECORATIVE EQUIPMENT PIECE USED AS A HANDLE

FIELD OF THE INVENTION

The invention relates to fittings, particularly handles for furniture and miscellaneous utensils, comprising a mollusc shell.

The invention also relates to mounts for fittings and accessories and also to a production process.

BACKGROUND OF THE INVENTION

The shells of molluscs or shellfish have been used in human activities since time immemorial. With few exceptions, shells are essentially fragile objects. Their uses are thus essentially ornamental (jewelry, such as pendants, earrings, necklaces, etc.). Their uses are very limited, particularly owing to the shells' inability to withstand mechanical stresses.

One type of ornamental use is described, in particular, in Patent EP 0,387,232, of the same title holder, which relates to a display stand for a shell.

Certain rare or particularly ornamental shells are the subject of specialized trade, which is sometimes criticized on ecological grounds. However, for many of the world's regions where the economy revolves around the sea, molluscs constitute a regular food source.

In such regions, shells which have been emptied of their contents are strictly regarded as waste products, and are discarded as such.

However, under their mineral and vegetable matrix, these rejects can be put to use if they are suitably cleaned, polished and, if appropriate, processed.

The object of the invention is to use empty mollusc shells, in particular those originating from the human food chain, in utilitarian applications.

One of the subjects of the invention is a fitting which is characterized in that it comprises
- a mollusc shell,
- a mount including at least one part suitable for being secured to the said shell,
- securing means suitable for securing the said mount to another member. This other member may be a fixed component or an item of furniture, the head of a tool or of a utensil. The shell comprises a strengthening agent composed essentially of a curable material suitable for being injected into at least a part of the cavity of this shell.

The shell is preferably pierced at the level of the mount with an orifice which opens out on a strengthened part of the said shell.

According to an advantageous embodiment, the mount comprises a hollow ring and an orifice placing the inside of the said ring and a seat suitable for receiving the shell in communication.

In such a case, the seat is preferably hollow and, over its periphery, it includes a re-entrant edge.

According to another advantageous embodiment, the mount is in the form of a sleeve, at least a part of the outer surface of this sleeve being in contact with the shell and the strengthening agent.

Optionally, the sleeve of the mount is open at its end which faces the cavity of the shell.

The shell is, for example, that of a Trochidae, and its opening may be closed off, in order to produce the fitting, by means of an appropriate material or a material formed by a capsule. The mount may comprise an anchoring component, the head of which is embedded in a curable material.

Another subject of the invention is a utensil which includes a fitting such as that described above, more particularly used as a handle or a fitting for furniture which includes such a handle.

A further subject of the invention is an item of furniture which is characterized in that it includes:
- a mollusc shell,
- a strengthening agent composed essentially of a curable material suitable for being injected into at least a part of the cavity of this shell,
- a mount including at least a part suitable for being secured to the said shell and to the said strengthening agent,
- securing means suitable for securing the said mount to another member.

A further subject of the invention is a mount for a shell handle which comprises:
- a ring of which the outer lateral surface is threaded,
- one of the axial ends of this ring including a hollow seat suitable for receiving the outer surface of a shell,
- this hollow seat communicates with the inner volume of the ring,
- a base includes a ferrule, the inner lateral surface of this base being threaded, to complement the first ring,
- the bottom of this base includes means for securing to a fixed member.

The hollow seat preferably includes an inwardly re-entrant edge.

A further object of the invention is the process for manufacturing a fitting which includes the following operations:
- cleaning the surface of a mollusc shell,
- placing, on a part of the shell, a first part of a mount including a seat of suitable shape, optionally filled with a hardened material,
- temporarily securing this mount part in place,
- filling a cavity of this mount part with a second curable material,
- hardening this second material,
- securing, to the first part of the mount, a second part including means for securing to another member.

The above process may also include the following operations:
- introducing a curable material into the said shell via a suitable orifice so that at least a part of this shell is filled with this curable material,
- allowing the said material to cure.

An advantage of the invention is that the shells treated in this way are capable of withstanding considerable stresses, particularly twisting and bending, which makes it possible for them to be used for utilitarian objects or parts of such objects (in particular, handles).

Fastening the shell onto a mount and possible strengthening of the shell distribute the mechanical stresses over three-dimensional (non-punctual) bearing zones in the shell, who structure gives the whole assembly remarkable mechanical properties.

It is thus possible to manufacture, for example, door knobs, cupboard knobs, drawer handles, coat pegs, curtain tie-backs, tap tops, decanter stoppers, corkscrews and other utensils or accessories, as well as a large number of utilitarian or decorative objects which acquire a durable nature.

BRIEF DESCRIPTION OF THE DRAWINGS

Other characteristics and advantages of the invention will become apparent from the following description of particular embodiments, reference being made to the appended drawings, in which:

FIGS. 3 and 8 are views, also in elevation, with tearing-away and partial section, of a bivalve shell equipped with various mounts;

FIG. 5 is a perspective view, with tearing-away, of a handle formed from a conical shell;

FIGS. 6 and 7 are plan views of fittings equipped with handles according to the invention.

DESCRIPTION OF THE EMBODIMENTS

The handles, fittings and utensils according to the invention may be obtained by various processes, particularly as described below.

Figure 1:
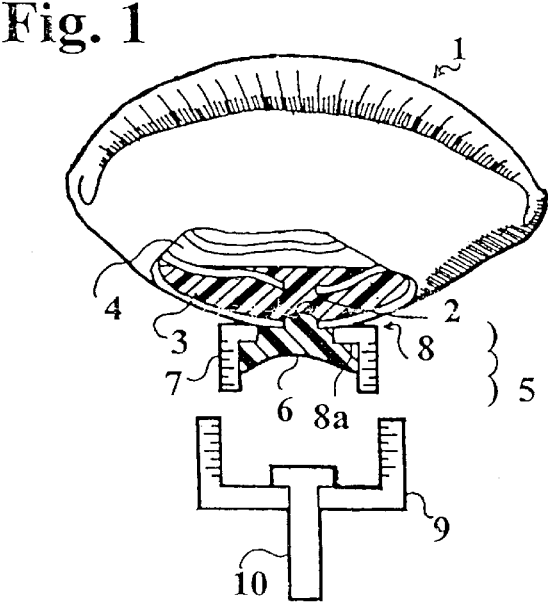
FIG. 1 is a view in elevation, with tearing-away and partial section, of a fitting according to the invention.

According to a first embodiment, shown in FIG. 1, for the shell 1 of a gastropod, a curable material 3, in liquid or pasty form, is introduced via the natural opening of the shell 1 or via an orifice 2 pierced in the shell.

In FIG. 1, only that part of the cavity 4 of the shell 1 which is located close to the seat of any stresses is reinforced. A mount 5, in this case a metal mount, is secured to the corresponding outer surface of the shell 1 by means of a curable material 6 which may be the same as the material 3 used for the filling.

Obviously, the mount 5 may be produced, depending on economic criteria, from any material which has the suitable mechanical qualities and, in particular, certain plastics.

A first part 7 of this mount 5, which is hollow, is in the shape of a ring and includes, at one of its ends, a seat 8 equipped with an edge 8a. This ring 7 includes an outer screw thread which fits together with the screw thread of a base 9 which may be secured by a suitable fastening means 10 to a piece of furniture, a partition, a door-frame element, or a utensil (domestic utensil, for example) (see FIGS. 6, 7).

Figure 2:
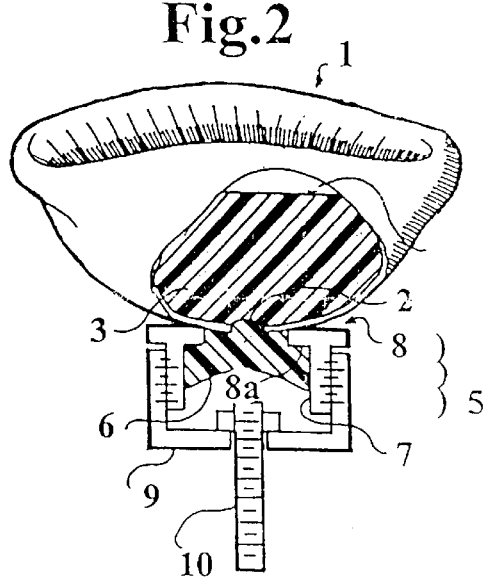
FIG. 2 is a similar view of another embodiment.

FIG. 2 shows a further embodiment: the shell 1 (in this case, also a gastropod shell) is almost completely filled by the curable material 3.

The procedure is generally as follows:

The curable material 3, whose viscosity is chosen as a function of the dimensions of the orifice 2 (it may be pasty if the opening is large), is introduced into the cavity 4. The hardening time is generally a few hours.

After identifying the ideal position, the ring 7 is positioned on the upturned shell 1 and held in position, for example by means of a few drops of hot-melt adhesive. The inside of the ring 7 is then filled with the curable mixture 6.

After the mixture 6 has hardened, a further amount of curable component is added (if necessary, depending on the type of application) and the base 9 is screwed finally in place.

Figure 3:
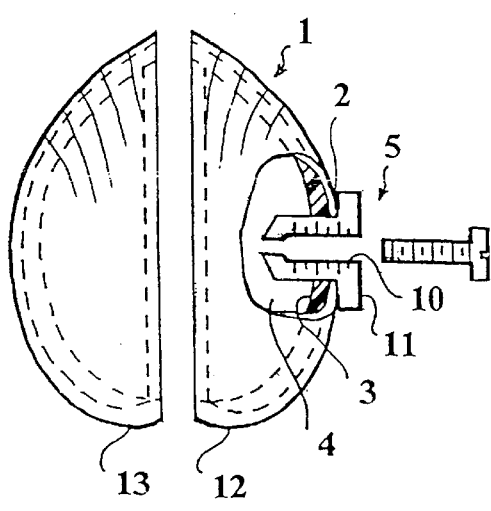

FIG. 3 shows an embodiment which uses the shell, with two valves 12, 13, of a bivalve mollusc. At least a part of the inner cavity 4 is lined with a curable material 3. The two valves 12, 13 forming the shell are secured along their periphery by means of an adhesive or curable material. The mount 5, in this case, is in the form of a threaded sleeve 11, inserted into an orifice 2 made in the valve 12.

As may be seen in FIG. 3, it is unnecessary to fill the shell completely in order to obtain good mechanical characteristics: a relatively thin layer of curable material spread inside the shell is also advantageous in certain applications.

The inner end of the sleeve 11 may be open at its end which is inserted into the inner cavity 4 of the shell 1, which makes it possible, if appropriate, to insert, into the volume thus made accessible, a food or cosmetic liquid or coloured fluids, as well as pills, granules or powders.

Depending on the direction in which it is held, it is possible to make the orifice 2 coincide with the joining plane of the two valves 12, 13.

Figure 4:
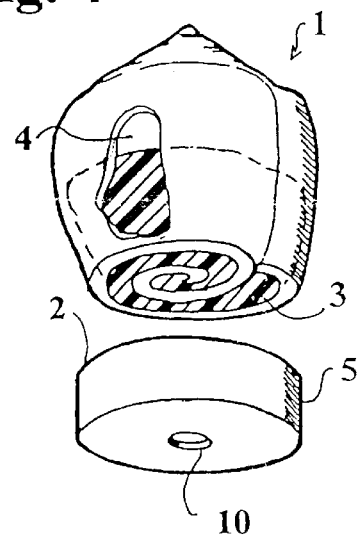
FIG. 4 is an exploded, perspective view based on a conical shell.

FIG. 4 shows, in an exploded view, the use of the shell 1 of a mollusc in the shape of a cone (Conidae). The lower point of this shell 1 has been cut off. The curable material 3 fills the lower part of the shell thus cut down, which is inserted into a dish-shaped mount 5.

It is also possible to use a sleeve 11, as shown in FIG. 3.

FIG. 5 shows a way of finishing which also contributes to the strengthening of a handle according to the invention: the opening 14 of the shell 1, in this case a Trochidae, is closed by a cap 15 so as to eliminate any edge or discontinuity. The opening 14 may thus be closed off by means of any appropriate material.

The choice of the type of mount 5 and the way in which this mount 5 is secured to the shell 1 obviously depend on the variety and on the size of the shell 1 used. Certain molluscs form a tight spiral, which is stronger. The thinness of the walls must also be taken into account. Finally, certain molluscs produce a very smooth shell, which is unsuitable for the use of adhesives.

It goes without saying that the concept developed here may be used for a wide variety of utensils, such as bottle stoppers, corkscrews 16 (see FIG. 6), bottle-openers 17 (see FIG. 7), matching cutlery, etc., and, in general, for any type of application involving stresses applied to the handle.

The varieties of mollusc which may be used include, in particular, the gastropods Cypraeidae, Trochidae, Turbinidae, Solaridae, etc. It will be noted that the embodiments shown in FIGS. 1 and 2 may be used, as desired, as a fitting, furnishing accessory, handle or peg.

Although the components illustrated can withstand considerable stresses, they may, of course, be used as simple ornamental components (for example, around a mirror, etc.).

FIG. 8 illustrates an embodiment suitable for bivalves with thin or weak shells. In this case, the procedure may involve fastening the mount 5 before securing the two valves 12, 13. The mount 5 comprises, in this case, a threaded rod 18. The seat is formed by a threaded washer 19. The orifice 2 is made after the valve 12 has been strengthened with the curable material 3. This prevents crushing of the valve or the formation of splinters.

A nut 20 is introduced from the inside onto the head of the threaded rod 18. The head is sealed in place by being embedded in the curable material 6. The rod 18 may be hollow and of larger diameter, which improves its stability.

The mount 5 could also be provided with an anchoring component with an extendable head, which may be positioned from the outside. A mount of this type may also be used with the shells of non-bivalve molluscs.

A selection of the natural colourways and tones of the shells makes it possible to produce matching sets of utensils or accessories in which each individual item is, however, unique.

The curable materials used may, in particular, be tile adhesives, polyester resins or various types of adhesive with a composition which is suitable for the materials used. Use may also be made of a combination of these different products.

It is desirable that these materials should have a neutral pH, given the materials that are present, and that they should not alter the natural pigments of the shells.

Mention may be made, by way of non-limiting example, of the two-component UNIPOX® epoxy resins and RECTICOL® polyurethane adhesive.

What is claimed is:

1. A fitting comprising:
   (a) handle means for applying a torsion to a utilitarian member secured to the fitting, said handle means comprising a mollusc shell and strengthening agent means within at least a part of the shell for imparting a mechanical strength to the shell that enables the shell to withstand stresses that result from the torsion, said strengthening agent means consisting essentially of a hardening material that prior to hardening, is injectable into the part of the shell;
   (b) a mount including at least one part secured to the shell, the mount comprising a sleeve having an outer surface, at least a part of the outer surface being in contact with the shell and the strengthening agent means; and
   (c) securing means for securing the mount to the utilitarian member.

2. A fitting according to claim 1, wherein the shell comprises an orifice, said mount being disposed at the orifice.

3. A fitting according to claim 2, wherein the mount comprises a sleeve having an outer surface, at least a part of the outer surface being in contact with the shell and the strengthening agent means.

4. A fitting according to claim 3, wherein the sleeve comprises a pierced end which faces the cavity of the shell.

5. A utensil comprising a fitting according to claim 1.

6. A utensil according to claim 5, wherein the fitting is a handle.

7. An apparatus comprising the fitting of claim 1 and the utilitarian member, said utilitarian member being secured to the mount.

8. An apparatus according to claim 7, wherein the utilitarian member is a corkscrew, a bottle stopper, a bottle opener, a door or cupboard knob, a drawer or a piece of cutlery.

9. A fitting according to claim 1, wherein the sleeve comprises thread means on an inner lateral surface thereof for threadable connection of the fitting to a threaded outer lateral surface of the utilitarian member with the utilitarian member received in the sleeve.

10. A fitting comprising:
    (a) handle means for applying a torsion to a utilitarian member secured to the fitting, said handle means comprising a mollusc shell and strengthening agent means within at least a part of the shell for imparting a mechanical strength to the shell that enables the shell to withstand stresses that result from the torsion, said strengthening agent means consisting essentially of a hardening material that, prior to hardening, is injectable into the part of the shell;
    (b) a mount including at least one part secured to the shell, wherein the mount comprises (i) a ring having an inner volume, an outer lateral surface that is threaded and an axial end comprising hollow seat means, including a hollow seat, for receiving an outer surface of the shell, the hollow seat communicating with the inner volume of the ring; and (ii) a base including a ferrule and an inner lateral surface that is threaded for threadable connection to the outer lateral surface of the ring; the base having a bottom that comprises securing means for securing the mount to the utilitarian member.

11. A fitting according to claim 10, wherein the hollow seat includes an inwardly re-entrant edge.

12. A fitting comprising:
    (a) handle means for applying a torsion to a utilitarian member secured to the fitting, said handle means comprising a mollusc shell and strengthening agent means within at least a part of the shell for imparting a mechanical strength to the shell that enables the shell to withstand stresses that result from the torsion, said strengthening agent means consisting essentially of a hardening material that, prior to hardening, is injectable into the part of the shell;
    (b) a mount including at least one part secured to the shell, the mount comprising rod means, including a rod with a threaded outer lateral surface in contact with the shell and the strengthening agent means, for threadable connection of the fitting with a threaded inner lateral surface of the utilitarian member; and
    (c) securing means for securing the mount to the utilitarian member.

\* \* \* \* \*